(12) United States Patent
Kim et al.

(10) Patent No.: US 6,753,627 B2
(45) Date of Patent: Jun. 22, 2004

(54) LINEAR MOTOR

(75) Inventors: Houng Joong Kim, Hitachi (JP); Kohji Maki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 09/971,640

(22) Filed: Oct. 9, 2001

(65) Prior Publication Data

US 2002/0070612 A1 Jun. 13, 2002

(30) Foreign Application Priority Data

Dec. 11, 2000 (JP) ........................................ 2000-381640

(51) Int. Cl.[7] .............................................. H02K 41/03
(52) U.S. Cl. ...................................................... 310/12
(58) Field of Search ............................. 310/12, 156.28, 310/218

(56) References Cited

U.S. PATENT DOCUMENTS

| | | | | |
|---|---|---|---|---|
| 4,246,505 A | * | 1/1981 | Yasaka et al. | 310/218 |
| 4,908,533 A | * | 3/1990 | Karita et al. | 310/12 |
| 5,331,245 A | * | 7/1994 | Burgbacher et al. | 310/186 |
| 6,104,117 A | * | 8/2000 | Nakamura et al. | 310/254 |
| 6,265,801 B1 | * | 7/2001 | Hashiba et al. | 310/214 |

FOREIGN PATENT DOCUMENTS

| | | | |
|---|---|---|---|
| JP | 360223461 A | * | 11/1985 |
| JP | 10174418 | | 6/1998 |

* cited by examiner

Primary Examiner—Burton S. Mullins
Assistant Examiner—Judson H. Jones
(74) Attorney, Agent, or Firm—Crowell & Moring LLP

(57) ABSTRACT

A linear motor has an armature; a moving member movable relatively to the armature; first and second magnetic pole tooth trains each having magnetic pole teeth magnetically coupled to one of two magnetic poles of the moving element, the first and second magnetic pole tooth trains being separated from each other in a direction substantially perpendicular to a moving direction of the moving member; and third and fourth magnetic pole tooth trains each having magnetic pole teeth magnetically coupled to the other of the two magnetic poles of the moving element, the third and fourth magnetic pole tooth trains being separated from each other in a direction substantially perpendicular to a moving direction of the moving member and the moving member being arranged between the first and second magnetic pole tooth trains and the third and fourth magnetic pole tooth trains.

12 Claims, 13 Drawing Sheets

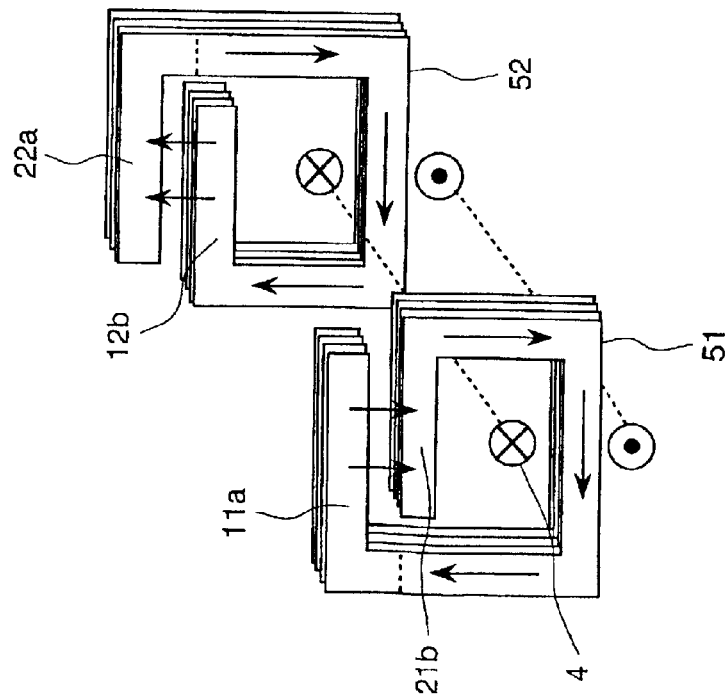
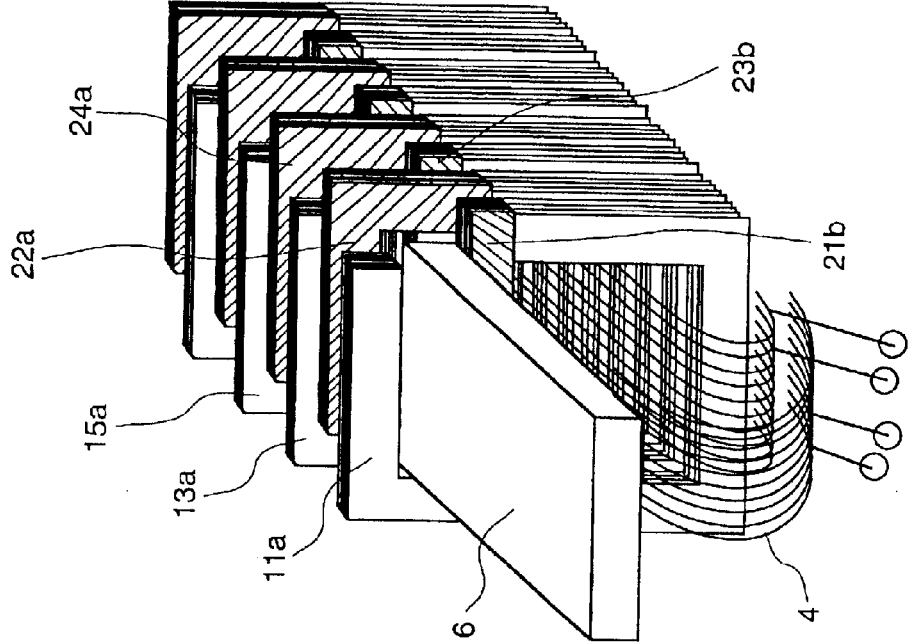
FIG. 2(a)
FIG. 2(b)

US 6,753,627 B2

LINEAR MOTOR

BACKGROUND OF THE INVENTION

This invention relates to a linear motor, and more particularly to a linear motor in which a moving member is interposed or sandwiched through a gap between magnetic pole teeth of an armature opposite to each other.

The conventional linear motor comprises a stator having a plurality of magnetic pole members and a moving member supported so as to be movable relatively to the stator through a gap. In general, the conventional linear motors are of a type cutting and opening a rotary machine and developing the opened rotary machine on a straight line.

Of such conventional linear motors, disclosed in the Japanese Patent Application Laid-Open No. 10-174481 (1998) is a linear motor in which a moving member is interposed through gaps between magnetic pole teeth of an armature opposite to each other to be relatively moved in order to reduce burdens on the moving member supporting mechanism by canceling out forces acting between the stator and the moving member.

However, the conventional linear motor is complicated in construction since a plurality of windings are wound on one stator unit. Further, adjacent stator magnetic pole members are wound with windings different from each other. Therefore, there is much waste in the space that the stator occupies.

SUMMARY OF THE INVENTION

An object of the present invention is to provide a linear motor which comprises a plurality of magnetic pole teeth while compact in construction because of the low number of windings and is capable of canceling out magnetic attracting forces acting between an armature and a moving member, in order to overcome the above defects of the conventional linear motor.

Another object of the present invention is to provide a linear motor in which an amount of change in inductance to an amount of relative displacement between the armature and the moving member is so reduced that thrust ripples are reduced.

According to an aspect of the present invention, a linear motor is provided which comprises an armature; a moving member movable relatively to the armature; first and second magnetic pole tooth trains each comprising magnetic pole teeth magnetically coupled to one of two magnetic poles of the moving element, the first and second magnetic pole tooth trains being separated from each other in a direction substantially perpendicular to a moving direction of the moving member; and third and fourth magnetic pole tooth trains each comprising magnetic pole teeth magnetically coupled to the other of the two magnetic poles of the moving element, the third and fourth magnetic pole tooth trains being separated from each other in a direction substantially perpendicular to a moving direction of the moving member; the magnetic pole teeth of the first magnetic pole tooth train and the magnetic pole teeth of the third magnetic pole tooth train being alternately arranged in the moving direction of the moving member, the magnetic pole teeth of the second magnetic pole tooth train and the magnetic pole teeth of the fourth magnetic pole tooth train being alternately arranged in the moving direction of the moving member, and the moving member being arranged between the first and second magnetic pole tooth trains and the third and fourth magnetic pole tooth trains.

According to another aspect of the present invention, a linear motor is provided which further comprises means for reducing an amount of change in inductance to an amount of relative displacement between the armature and the moving member so as to reduce detent forces.

These and other objects and features of the present invention will become apparent from the descriptions of preferred embodiments of the present invention taken in connection with the accompanying drawings.

BRIEF DESCRIPTION OF THE DRAWINGS

FIG. 2A is a conceptual view illustrating the basic configuration of another embodiment of the linear motor according to the present invention which is fabricated by using laminated steel plates, wherein the magnetic flux is generated in the direction indicated by arrows;

FIG. 2B is a perspective view illustration of a multi-magnetic pole tooth type of linear motor fabricated on the basis of the basic configuration of the embodiment shown in FIG. 2A and by using laminated steel plates;

DETAILED DESCRIPTION OF THE PREFERRED EMBODIMENT

Figure 1A:
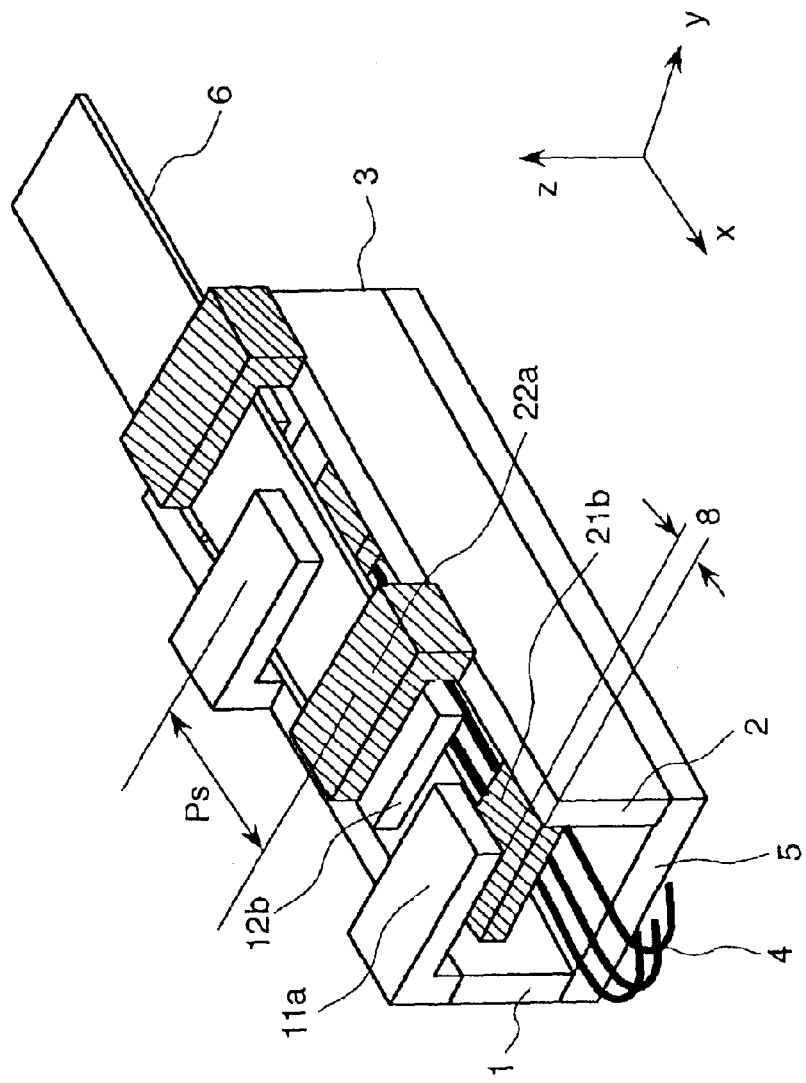
FIG. 1A is a perspective view illustrating the basic configuration of an embodiment of a linear motor according to the present invention.

Embodiments of a linear motor according to the present invention will be described with reference to FIGS. 1A to 14. The same reference character is used for the same or equivalent part, member or element in different figures.

Figure 1B:
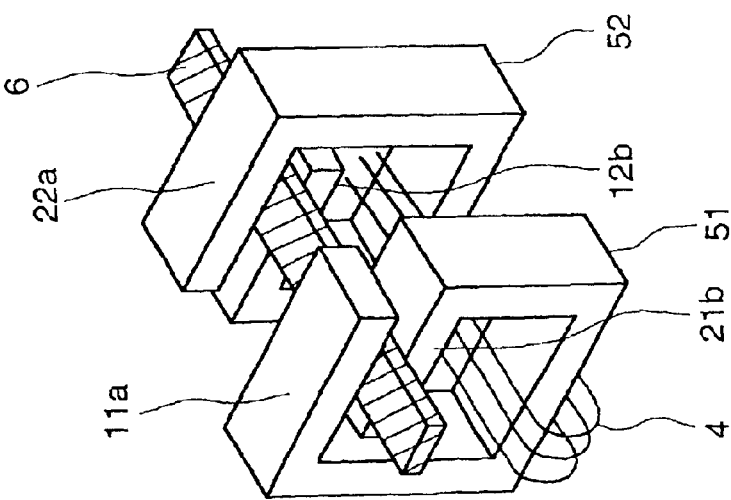
FIG. 1B is a perspective illustration of a multi-magnetic pole teeth type of linear motor constructed on the basis of the basic configuration of the embodiment shown in FIG. 1A.

FIG. 1A shows the basic configuration of an embodiment of a linear motor according to the present invention, and FIG. 1B shows a multi-magnetic pole tooth type of linear motor into which the basic configuration of the embodiment shown in FIG. 1A is expanded.

In FIG. 1A, numeral 51 designates a core having a first opposed portion, and numeral 52 a second opposed portion. The cores 51 and 52 are so constituted that upper and lower magnetic poles of one of the cores 51 and 52 are reverse in polarity to those of the other thereof.

The first opposed portion comprises an upper magnetic pole tooth 11a and a lower magnetic pole tooth 21b of the core 51, and the second opposed portion a lower magnetic pole tooth 12b and an upper pole tooth 22a of the core 52. Accordingly, an armature is so constituted that the (2n-1)-th core is the first opposed portion and the (2n)-th core is the second opposed portion, where n=1, 2, 3, ...

Thought each of the cores 51 and 52 is wound with one winding as shown in FIG. 1A, a plurality of windings into which the one winding is divided may be wound on a plurality of portions of each of the cores 51 and 52.

A mover or moving member 6 is interposed between the upper and lower magnetic pole teeth 11a and 21b of the core 51 and further between the upper and lower magnetic pole teeth 22a and 12b of the core 52, and is moved relatively to the armature. The armature comprises the core and a winding 4, and the moving member comprises a permanent magnet, magnetic member or non-magnetic member.

Provided between the upper and lower magnetic pole teeth of each of the first and second opposed portions is a gap through which the moving member is interposed or sandwiched between the upper and lower magnetic pole teeth of each of the first and second opposed portions. As a result, the magnetic flux is generated in an alternating manner in the vertical direction through the gap between the upper and lower magnetic pole teeth of the opposed portion of each armature.

FIG. 2A shows the basic configuration of another embodiment of a linear motor according to the present invention which is fabricated by using laminated steel plates, wherein the magnetic flux is generated in the direction indicated by arrows. FIG. 2B shows a multi-magnetic pole tooth type of linear motor into which the basic configuration of the embodiment shown in FIG. 2A is expanded and which is fabricated by using laminated steel plates. In FIGS. 2A and 2B, the magnetic flux is alternatingly generated in the vertical direction through the gap between the upper and lower magnetic pole teeth (11a, 22a and 21b, 12b) of the opposed portion of each armature 3.

In the embodiments shown in FIGS. 2A and 2b, attracting forces acting between the moving member 6 and the upper magnetic pole teeth (11a, 22a) are approximately the same in magnitude as those acting between the moving member 6 and the lower magnetic pole teeth (21b, 12b) but reverse in direction thereto, so that the whole attracting forces become small. Therefore, since the attracting forces between the moving member 6 and the magnetic pole teeth of the armatures 3 can be reduced, the burdens on a moving member supporting mechanism can be reduced.

In FIG. 2B, the armature 3 is fabricated by using laminated steel plates and a plurality of first opposed portions and a plurality of second opposed portions are arranged. That core portion of the armature 3 which is wound with the winding 4 and the magnetic pole teeth between which the moving member 6 is interposed are separately fabricated by using laminated steel plates and combined with each other.

Figure 3:
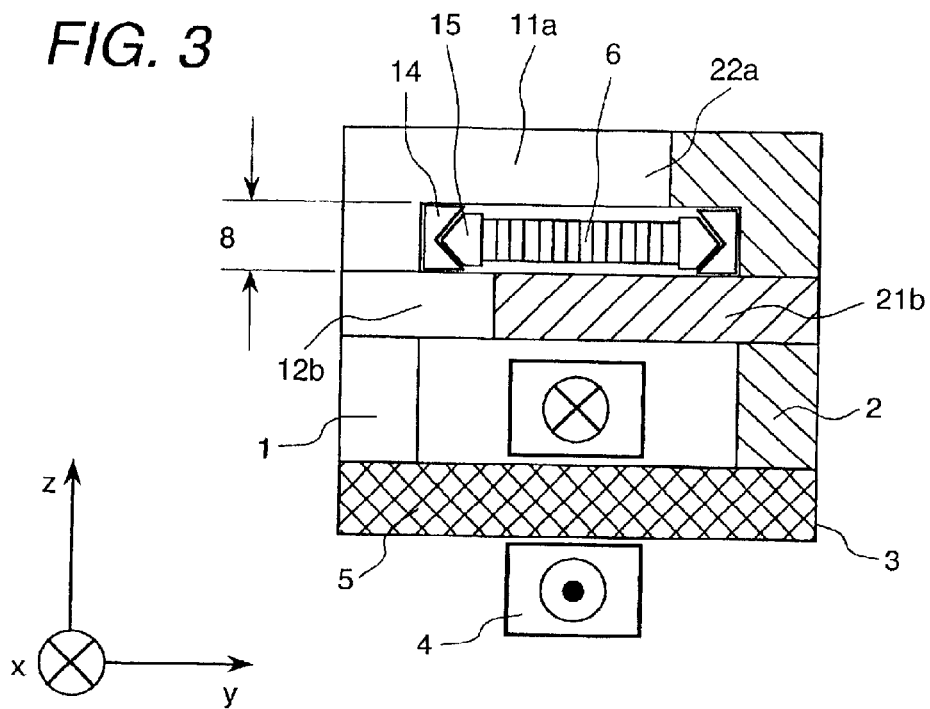
FIG. 3 is a vertical side sectional view of the embodiment shown in FIGS. 1A, 1B, 2A or 2B.

FIG. 3 is a vertical side sectional view of the embodiment shown in FIGS. 1A, 1B, 2A or 2B. In FIG. 3, moving member supporting mechanisms 14 and 15 are respectively attached to the armature 3 and the moving member 6 to support the moving member 6, so that the moving member 6 is moved relatively to the armature 3 through the gap 8 as if it passed a tunnel, with the moving member 6 supported by the moving member supporting mechanisms 14 and 15.

Figure 4:
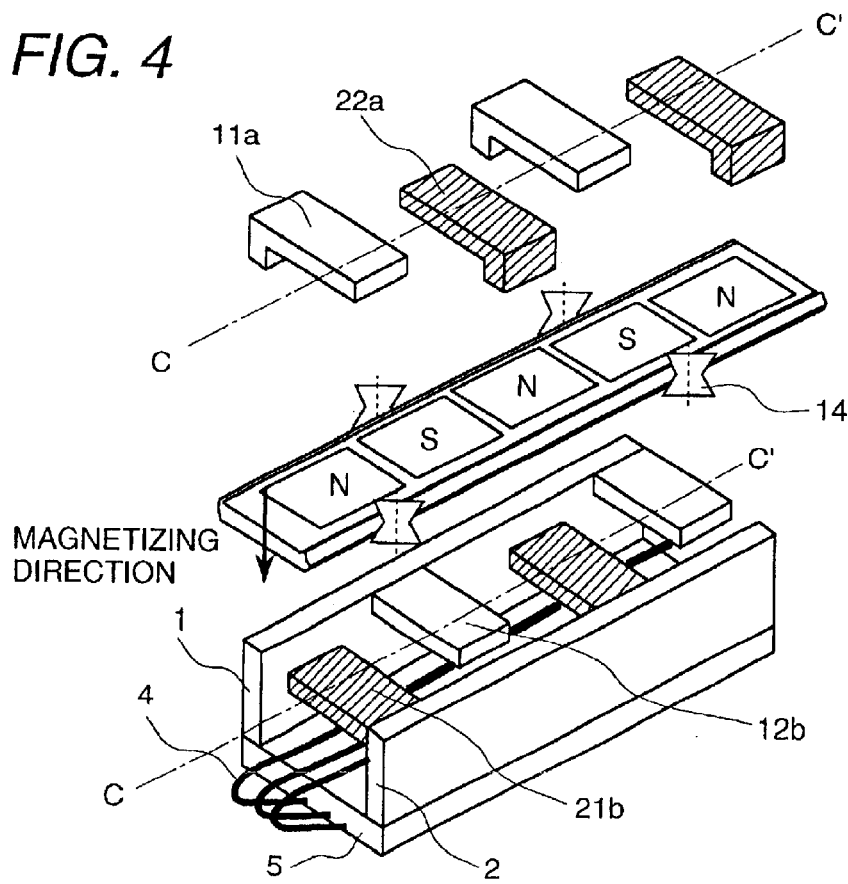
FIG. 4 is a vertically exploded perspective illustration of the embodiment shown in FIG. 1B.
Figure 5:
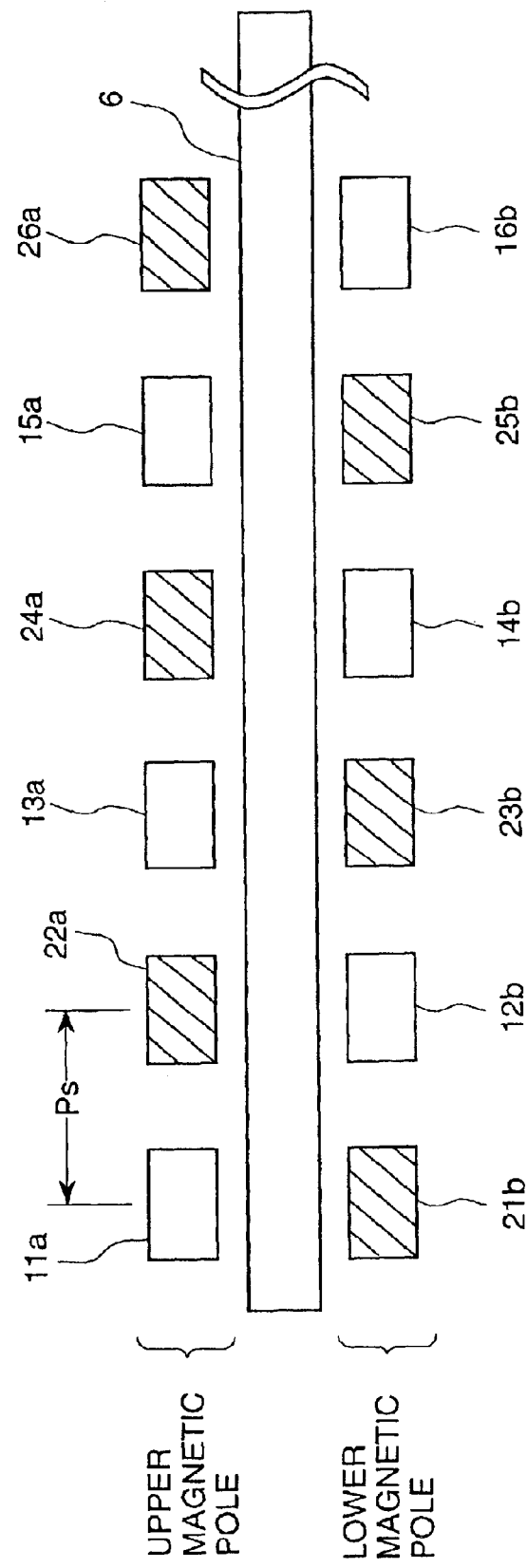
FIG. 5 is a vertical front sectional illustration, of the opposite portions of upper and lower magnetic pole tooth trains to a moving member, taken along the line C—C' of FIG. 4.

FIG. 4 is a vertically exploded perspective illustration of the embodiment shown in FIG. 1B. FIG. 5 is a vertical front sectional illustration, of those portions of the upper and lower magnetic pole tooth trains which are opposed to the moving member, taken along the line C—C' of FIG. 4.

According to the embodiment shown in FIGS. 4 and 5, an amount of change in inductance to an amount of relative displacement between both the upper magnetic pole tooth trains (11a, 22a, 13a, 24a, ... ) and lower magnetic pole tooth trains (21b, 12b, 23b, 14b, ... ) and magnetic poles with which the moving member 6 is increased, and therefore thrust ripples are also increased. In FIG. 4, though the magnetic poles with which the moving member 6 is provided is of a permanent magnet type, they may be of a bumpy variable reluctance type, a combination type of the permanent magnet type and the bumpy variable reluctance type, or a winding type. Ps represents a pole pitch of the magnetic pole teeth.

Various measures to reduce the thrust ripples will be explained with reference to FIGS. 6 to 14.

Figure 6:
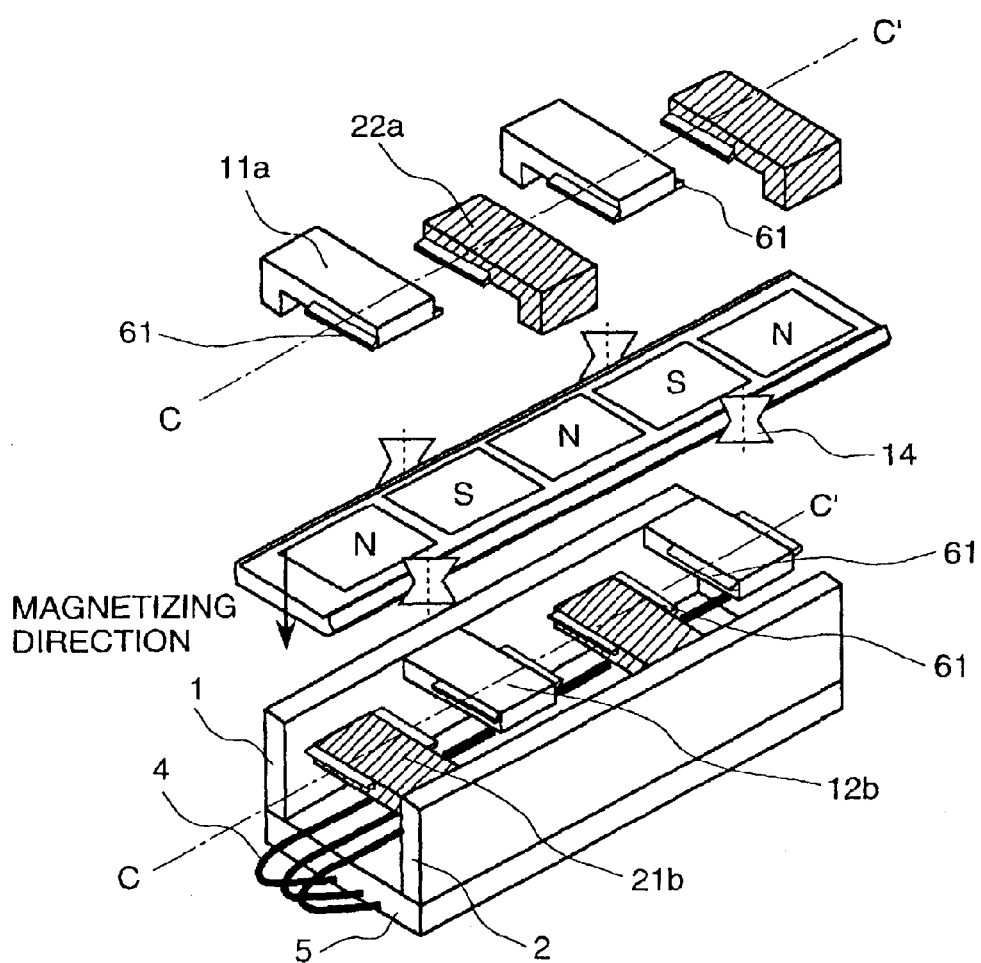
FIG. 6 is a vertically exploded perspective illustration of an additional embodiment of a linear motor according to the present invention.
Figure 7:
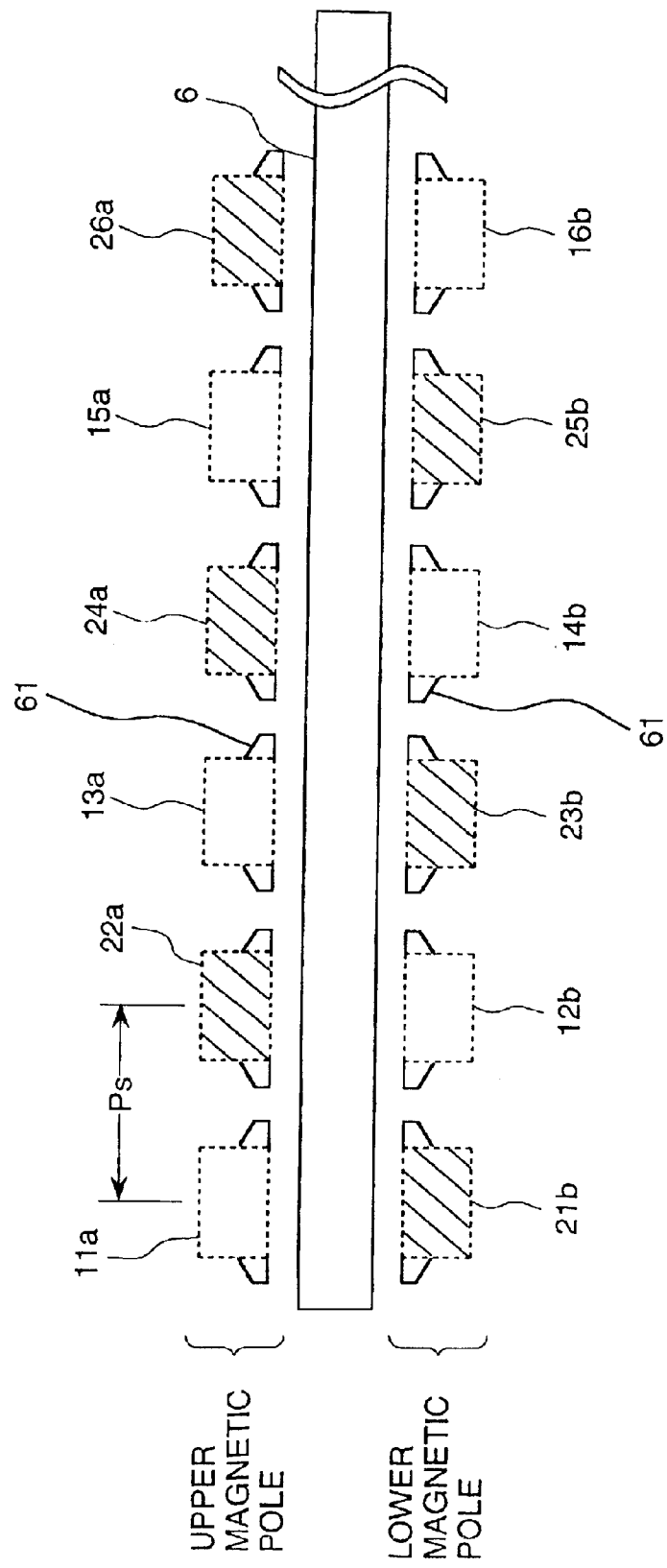
FIG. 7 is a vertical sectional illustration, of the opposite portions of upper and lower magnetic pole tooth trains to a moving member, taken along the line C—C' of FIG. 6.

FIG. 6 is a vertically exploded perspective illustration of an additional embodiment of a linear motor according to the present invention. FIG. 7 is a vertical sectional illustration, of the opposite portions of the upper and lower magnetic pole tooth trains to the moving member, taken along the line C—C' of FIG. 6.

In FIGS. 6 and 7, the opposite portion of each magnetic pole tooth to the moving member is provided with magnetic pole pieces 61 at both the ends thereof in the direction of movement of the moving member. Therefore, that portion of each magnetic pole tooth of the magnetic pole tooth trains which is opposed to the moving member is different in width from that portion of each magnetic pole tooth which is not opposed to the moving member. The depth dimension of each of the magnetic pole pieces may be the same as that of the opposite portion of each magnetic pole tooth to the moving member, or may be so adjusted as to become larger or smaller than the latter dimension as necessary. The pole piece 61 and each magnetic pole tooth may be integrally fabricated, or may be combined with each other after they are separately fabricated.

Consequently, as understood from comparison of FIGS. 5 and 7, the amount of change in inductance to the amount of relative displacement between the adjacent different poles is reduced, so that the thrust ripple and hence noise and vibration are reduced.

Figure 8:
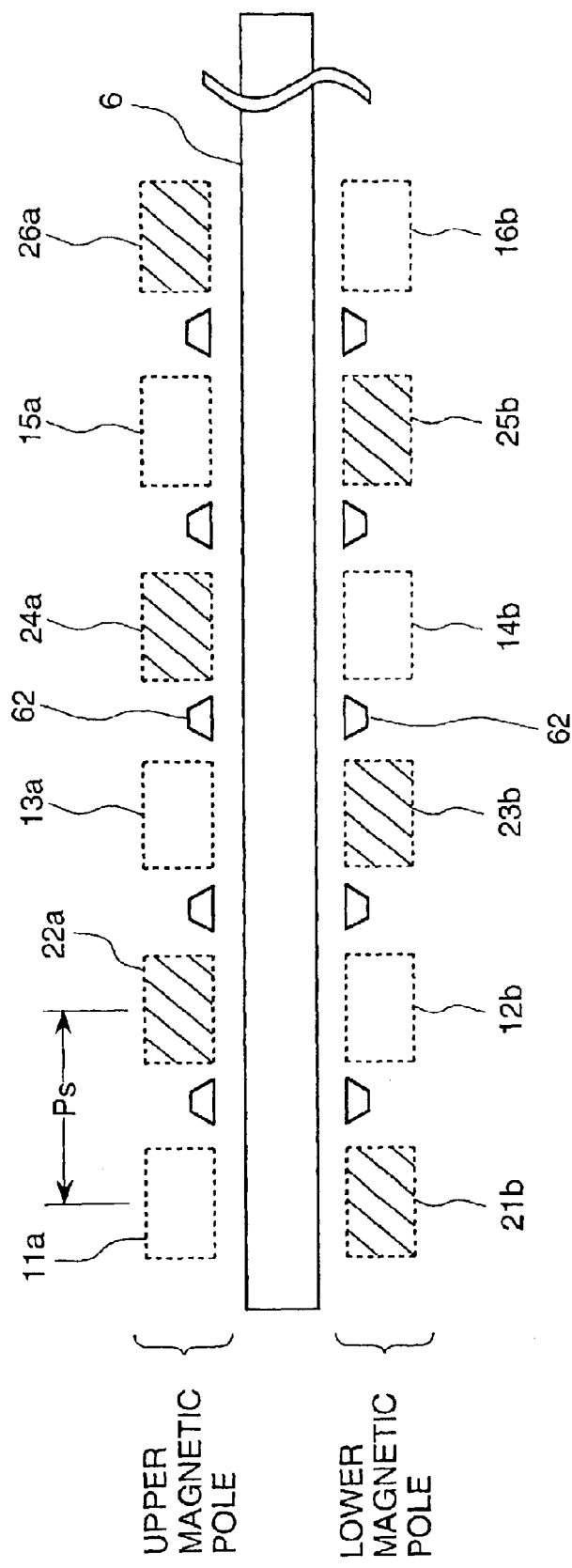
FIG. 8 is a vertical sectional illustration of the opposite portions of upper and lower magnetic pole tooth trains to a moving member of yet another embodiment of a linear motor according to the present invention.

FIG. 8 is a vertical sectional illustration of the opposite portions of the upper and lower magnetic pole tooth trains to the moving member of yet another embodiment of a linear motor according to the present invention. In FIG. 8, dummy magnetic poles 62 are provided between the adjacent different magnetic pole teeth.

Figure 9:
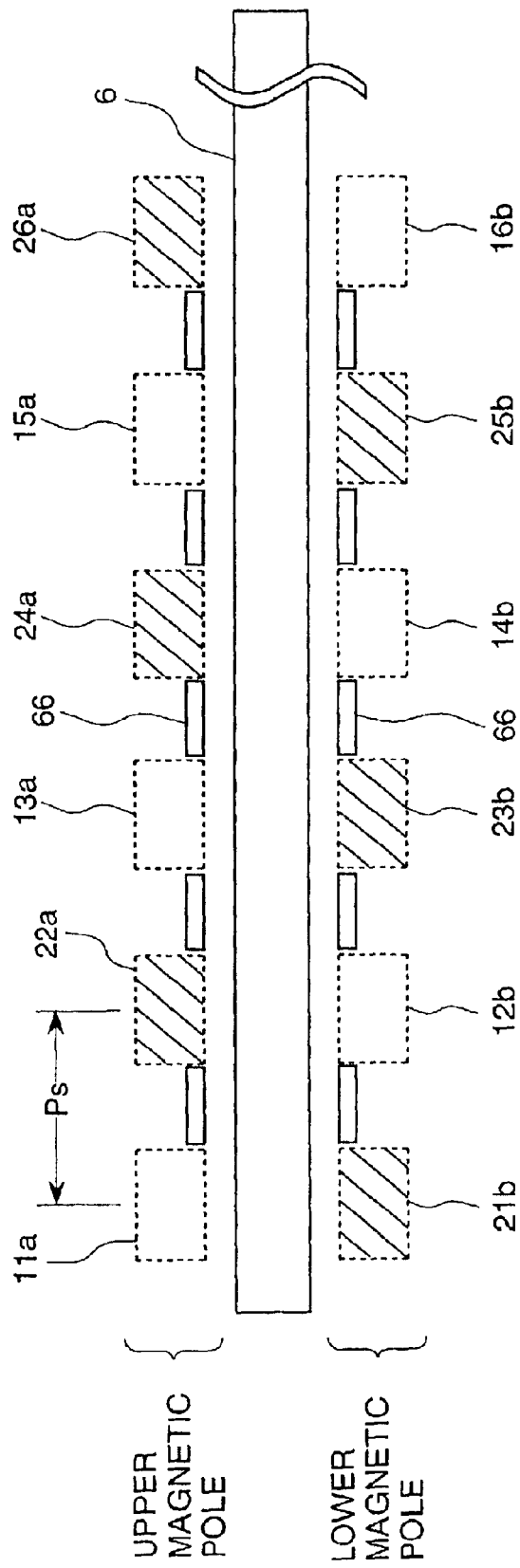
FIG. 9 is a vertical sectional illustration of the opposite portions of upper and lower magnetic pole tooth trains to a moving member of a further embodiment of a linear motor according to the present invention.

FIG. 9 is a vertical sectional illustration of the opposite portions of the upper and lower magnetic pole tooth trains to the moving member of a further embodiment of a linear motor according to the present invention. In FIG. 9, magnetic wedges 66 are provided between the adjacent different magnetic pole teeth.

Figure 10:
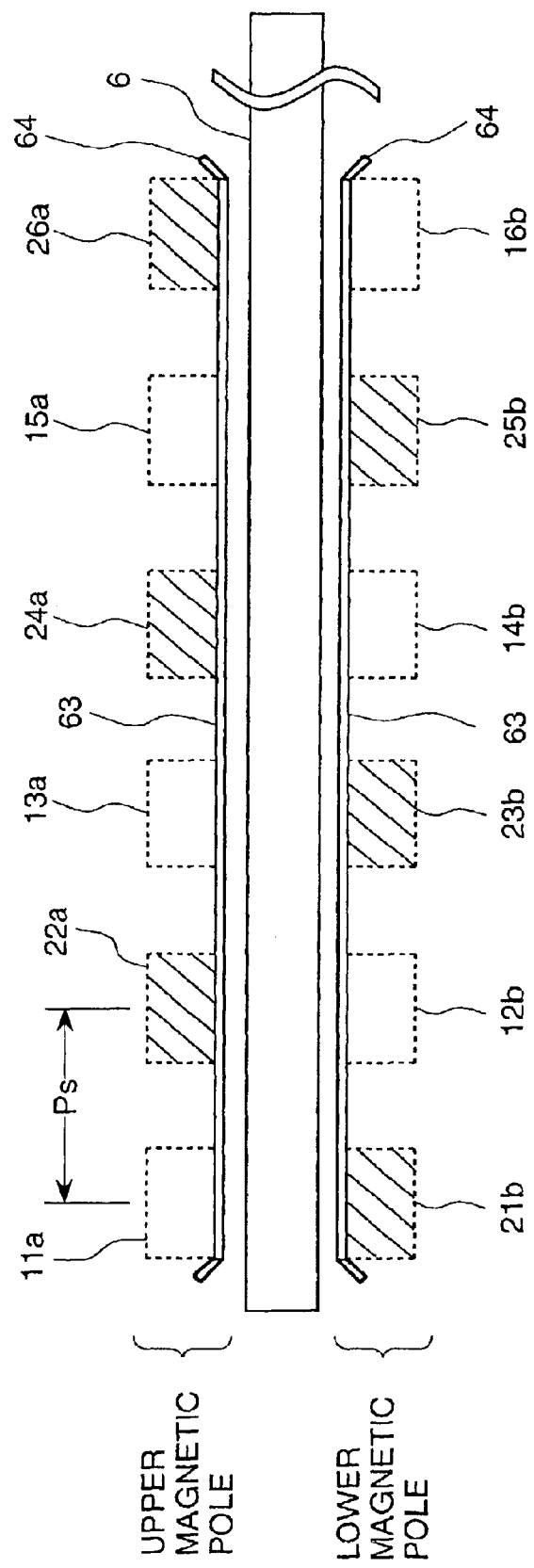
FIG. 10 is a vertical sectional illustration of the opposite portions of upper and lower magnetic pole tooth trains to a moving member of a further additional embodiment of a linear motor according to the present invention.

FIG. 10 is a vertical sectional illustration of the opposite portions of the upper and lower magnetic pole tooth trains to the moving member of a further additional embodiment of a linear motor according to the present invention. In FIG. 10, magnetic plates 63 are affixed or attached to opposite portions of the magnetic pole tooth trains to the moving member. The magnetic plates 63 each have guide plates 64 at both ends thereof in the direction of movement of the moving member 6 so that the same is easy to be introduced into the gap between the guide plates 64.

In FIGS. 8, 9 and 10, the depth dimension of the dummy magnetic poles 62, the magnetic wedge 66 and the magnetic plates 63 may be the same as that of the opposite portion of each magnetic pole tooth to the moving member, or may be so adjusted as to become larger or smaller than the latter dimension as necessary.

Figure 11:
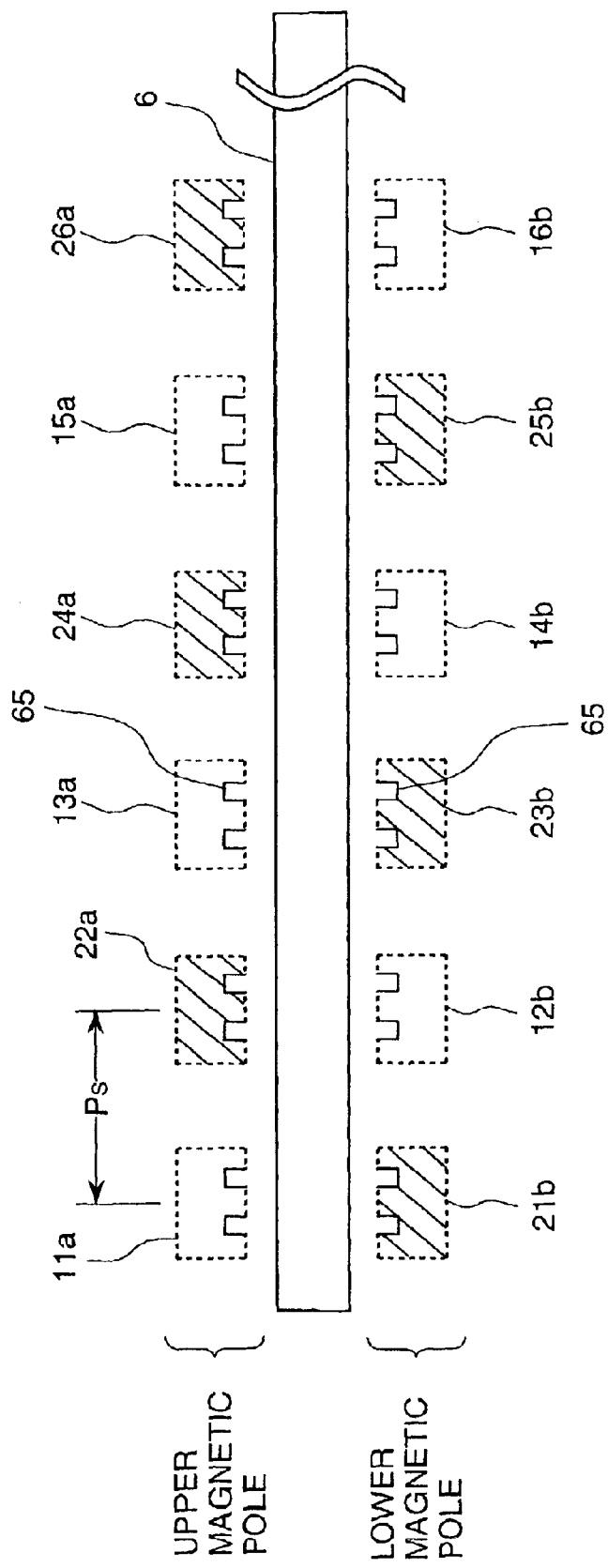
FIG. 11 is a vertical sectional illustration of the opposite portions of upper and lower magnetic pole tooth trains to a moving member of still another embodiment of a linear motor according to the present invention.

FIG. 11 is a vertical sectional illustration of the opposite portions of the upper and lower magnetic pole tooth trains to the moving member of still another embodiment of a linear motor according to the present invention. In FIG. 11, the opposite surface of each magnetic pole tooth to the moving member has grooves 65. The grooves 65 may be formed by laminating a plurality of steel plates which are different in size from one another, or cutting a solid magnetic material.

Figure 12:
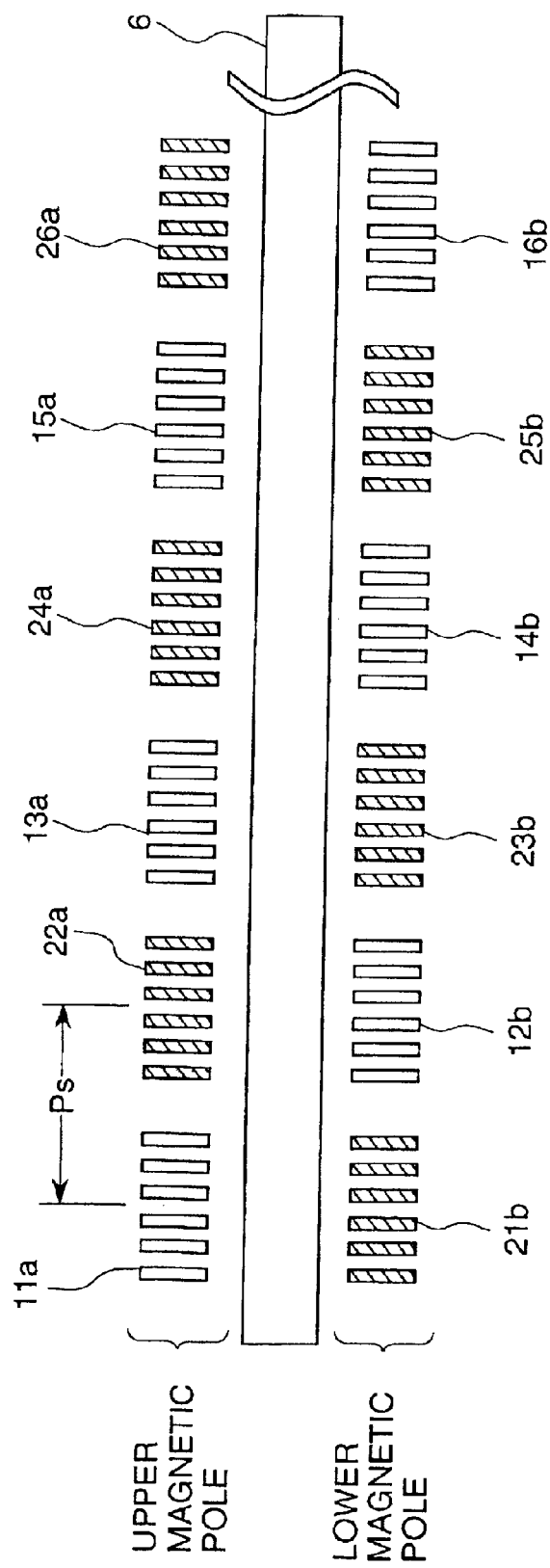
FIG. 12 is a vertical sectional illustration of the opposite portions of upper and lower magnetic pole tooth trains to a moving member of also another embodiment of a linear motor according to the present invention.

FIG. 12 is a vertical sectional illustration of the opposite portions of upper and lower magnetic pole tooth trains to the moving member of also another embodiment of a linear motor according to the present invention. In FIG. 12, each pole tooth of the magnetic pole tooth trains comprises a plurality of magnetic pole tooth elements which are the same in magnetic polarity as one another and are arranged at predetermined intervals. Further, the embodiment shown in FIG. 12 is not provided with magnetic materials of the portions corresponding to the grooves of FIG. 11.

Figure 13:
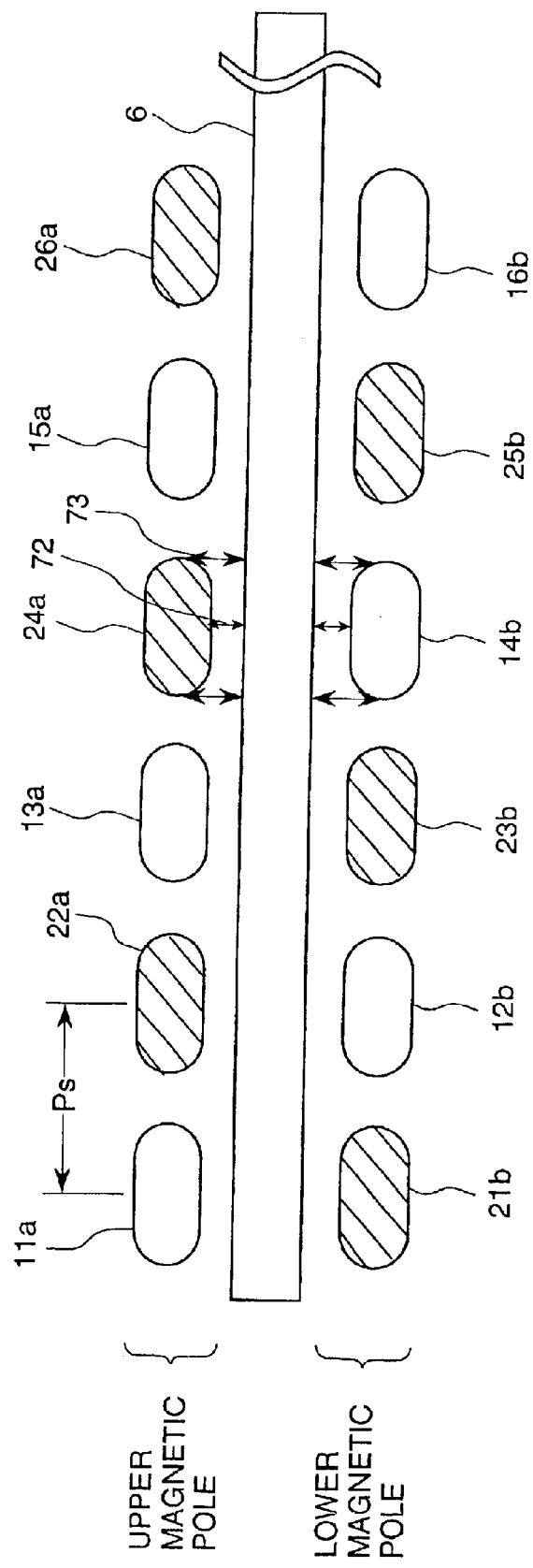
FIG. 13 is a vertical sectional illustration of the opposite portions of upper and lower magnetic pole tooth trains to a moving member of an yet further embodiment of a linear motor according to the present invention.

FIG. 13 is a vertical sectional illustration of the opposite portions of upper and lower magnetic pole tooth trains to a moving member of a yet further embodiment of a linear motor according to the present invention. In FIG. 13, a gap or distance between the central portion of each magnetic pole tooth of the magnetic pole tooth trains and the moving member is different from that between the portion on each side of each magnetic pole tooth of the magnetic pole tooth trains and the moving member. That portion of each magnetic pole tooth which is not opposed to the moving member may not be the same in shape as the opposite portion of each magnetic pole tooth to the moving member.

Figure 14:
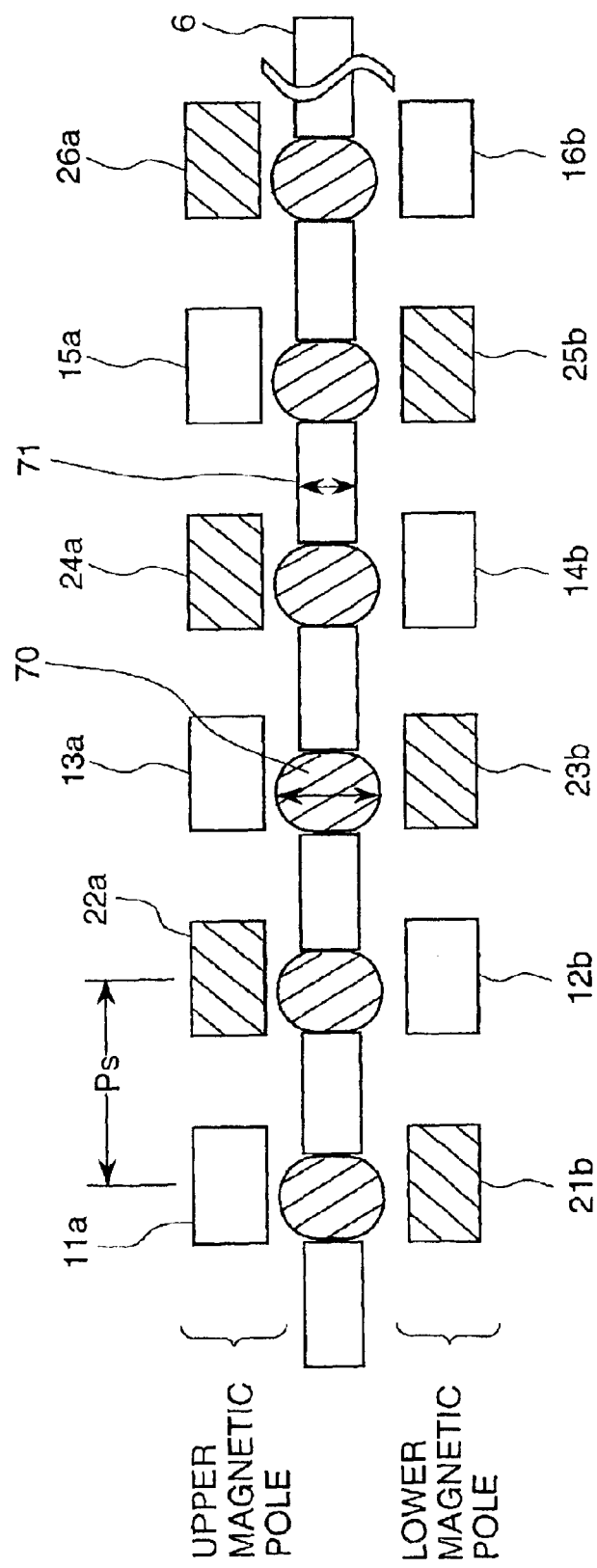
FIG. 14 is a vertical sectional illustration of the opposite portions of upper and lower magnetic pole tooth trains to a moving member of a yet further additional embodiment of a linear motor according to the present invention.

FIG. 14 is a vertical sectional illustration of the opposite portions of upper and lower magnetic pole tooth trains to the moving member of a yet further additional embodiment of a linear motor according to the present invention.

In FIG. 14, the moving member comprises permanent magnets and objects 70 which are arranged among the permanent magnets. The objects 70 are thicker than the permanent magnets in the direction of magnetization thereof. That is, thickness 71 of the permanent magnets is thinner than that of the objects 70. According to this embodiment, the permanent magnets are prevented from and protected against contacting the opposite portions of the upper magnetic pole teeth or the lower magnetic pole teeth to the moving member, even when the moving member is offset on the side of the upper or lower magnetic pole teeth.

With respect to the shape of the magnetic pole teeth, combinations of two or more of the embodiments shown in FIGS. 6 to 13 may be used in addition to the embodiment shown in FIG. 14.

In the embodiments explained above, the armature is fixedly supported and the moving member is moved. However, the armature may be moved with the moving member supported fixedly.

It would be appreciated from the foregoing description that the present invention makes it possible to shorten the magnetic path of a magnetic circuit for the effective magnetic flux and to reduce magnetic leakage from the magnetic pole teeth, thereby allowing efficiency of the linear motor to be increased and power thereof to be raised.

According to the embodiments of the present invention, attracting forces acting between the moving member 6 and the upper magnetic pole teeth are approximately the same in magnitude as those acting between the moving member and the lower magnetic pole teeth but reverse in direction thereto, so that the whole attracting forces become small. Therefore, since the attracting forces between the moving member 6 and the magnetic pole teeth of the armatures 3 can be reduced, the burdens on the moving member supporting mechanism can be reduced.

Further, an amount of change in inductance to an amount of relative displacement between the armature and the moving member is reduced, so that thrust ripples are reduced.

Since it is obvious that many changes and modifications can be made in the above-described details without departing from the nature and spirit of the present invention, it is to be understood that the present invention is not to be limited to the details described herein.

What is claimed is:

1. A linear motor, which comprises:
    an armature;
    a moving member movable relatively to the armature;
    first and second magnetic pole tooth trains each comprising magnetic pole teeth magnetically coupled to one of two magnetic poles of the moving element, the first and second magnetic pole tooth trains being separated from each other in a direction substantially perpendicular to a moving direction of the moving member; and
    third and fourth magnetic pole tooth trains each comprising magnetic pole teeth magnetically coupled to the other of the two magnetic poles of the moving element, the third and fourth magnetic pole tooth trains being separated from each other in a direction substantially perpendicular to a moving direction of the moving member;
    the magnetic pole teeth of the first magnetic pole tooth train and the magnetic pole teeth of the third magnetic pole tooth train being alternately arranged in the moving direction of the moving member, the magnetic pole teeth of the second magnetic pole tooth train and the magnetic pole teeth of the fourth magnetic pole tooth train being alternately arranged in the moving direction of the moving member, and the moving member being arranged between the first and second magnetic pole tooth trains and the third and fourth magnetic pole tooth trains.

2. A linear motor according to claim 1, which further comprises means for reducing an amount of change in inductance to an amount of relative displacement between the armature and the moving member.

3. A linear motor according to claim 1, which further comprises a magnetic plate attached to portions of the magnetic pole tooth trains opposite to the moving member.

4. A linear motor according to claim 1, wherein that portion of each magnetic pole tooth of the magnetic pole tooth trains which is opposed to the moving member is different in width from that portion of each magnetic pole tooth which is not opposed to the moving member.

5. A linear motor according to claim 1, which further comprises a dummy magnetic pole provided between adjacent magnetic pole teeth different in magnetic polarity from each other in the magnetic pole tooth trains.

6. A linear motor according to claim 1, which further comprises a magnetic wedge provided between adjacent magnetic pole teeth different in magnetic polarity from each other in the magnetic pole tooth trains.

7. A linear motor according to claim 1, wherein that surface of each magnetic pole tooth of the magnetic pole tooth trains which is opposed to the moving member has grooves.

8. A linear motor according to claim 1, wherein each magnetic pole tooth of the magnetic pole tooth trains comprises a plurality of magnetic pole tooth elements which are the same in magnetic polarity as one another and are arranged at predetermined intervals.

9. A linear motor according to claim 1, wherein a distance between a central portion of each magnetic pole tooth of the magnetic pole tooth trains and the moving member is different from that between a portion on each side of each magnetic pole tooth of the magnetic pole tooth trains and the moving member.

10. A linear motor according to claim 1, wherein the moving member comprises permanent magnets and objects which are thicker than the permanent magnets in a direction of magnetization thereof, the objects being arranged among the permanent magnets.

11. A linear motor according to claim 1 or 2, wherein the armature is fixedly supported and the moving member is moved.

12. A linear motor according to claim 2, wherein the armature is fixedly supported and the moving member is moved.

* * * * *